Patented Dec. 12, 1950

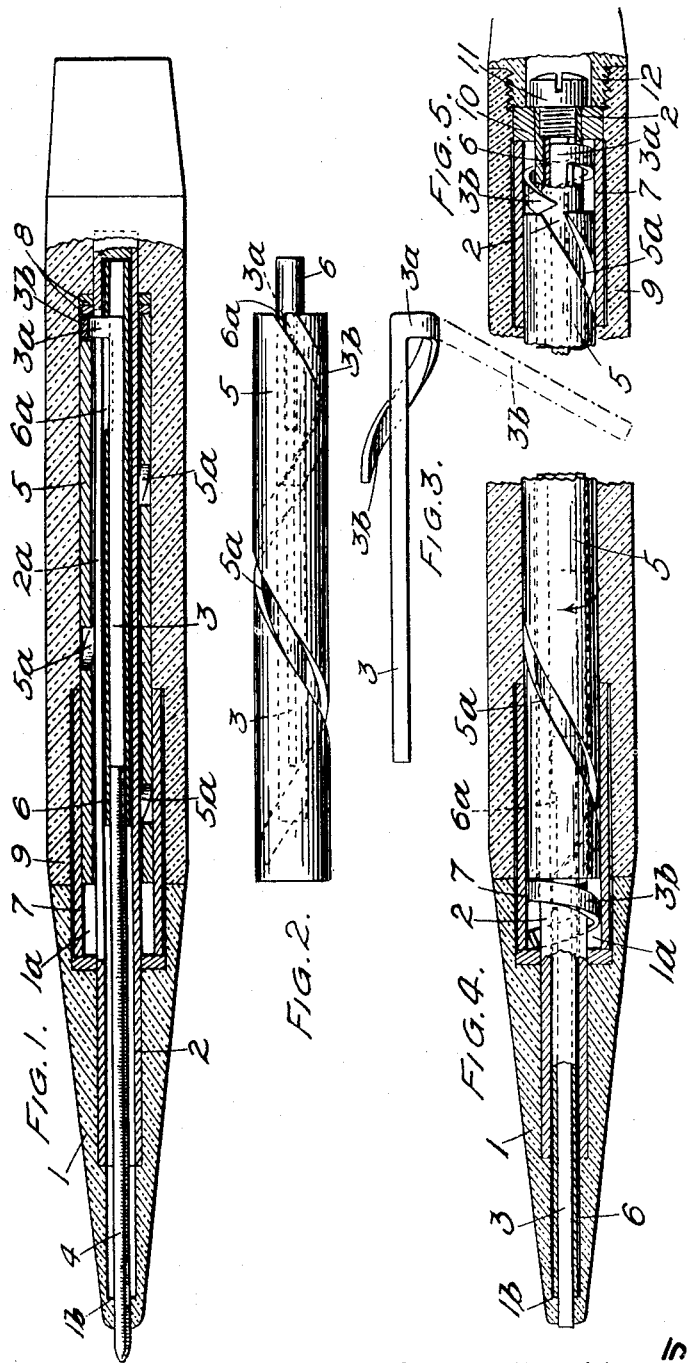

2,534,091

UNITED STATES PATENT OFFICE 2,534,091

MECHANICALLY OPERATED PENCIL WITH SCREW FEED

George Hugo Weinberger, London, England, assignor to Henry Weinberger Limited, London, England, a British company Application February 4, 1948, Serial No. 6,147
In Great Britain November 29, 1943

Section 1, Public Law 690, August 8, 1946
Patent expires November 29, 1963

7 Claims. (Cl. 120—18)

This invention relates to mechanically operated pencils. The object of the invention is the provision of improvements in such pencils. The invention consists broadly of a mechanically operated pencil comprising a fixed tubular hub with a longitudinal slot through its wall, a tube formed with a helical slot, said helix surrounding said hub and being capable of rotary movement but being substantially fixed in respect of longitudinal movement on said hub, a stick for propelling the lead located within said hub, a lateral projection extending from said stick and passing through said longitudinal slot in said hub, a helical portion extending from said lateral projection outside said hub, said helical portion lying within the helical slot of said tube, whereby rotation of said tube causes said helical portion, and therefore said stick to move longitudinally in said hub, means whereby, as said stick approaches one end of its stroke, said helical portion is progressively screwed out of the corresponding end of said helical slot, and stop means whereby said helical portion during such progressive screwing-out is stopped so that continued screwing-out causes said helical portion to be compressed in the manner of a spring until said helical portion is screwed completely out of said helical slot, whereupon continued rotation of said tube can be effected without damage, the compression of said helical portion ensuring its re-entry into said helical slot upon rotation of said tube in the opposite direction.

This arrangement also assures smooth working by spreading the drive over the leading edge of the helical portion, instead of the drive depending solely on a pin formed by bending up the stick through the tube slot.

In order that the invention may be the more clearly understood a mechanically operated pencil in accordance therewith will now be described, reference being made to the accompanying drawings wherein—

Figure 1 is a longitudinal section of said pencil with the "stick" and lead-holder in the fully retracted position;

Figure 2 is a side elevation of the "tube" together with the "stick" and lead-holder;

Figure 3 is a side elevation of the stick, indicating the manner in which the lateral projection thereof is formed;

Figure 4 is a similar view to Figure 1 with the stick and lead-holder in the fully forward position, the stick having moved forwardly relative to the lead-holder for expelling the lead;

Figure 5 is a similar view to Figure 1 of the butt end of the pencil, illustrating a modification.

Referring first to Figure 1 to 4, the mechanically operated pencil comprises the usual point element 1 having rigidly affixed to it and extending rearwardly from it a standard tubular hub 2. This hub 2 has located in it the so-called stick 3 which propels the lead 4, and the propulsion of the stick is effected by virtue of the rear end thereof projecting laterally through a longitudinal slot 2a in the hub, and into a spiral slot 5a in the wall of a tube 5 surrounding the hub and rotatable thereon but substantially fixed in relation to axial movement. This last named tube 5 is usually termed the helix. The stick 3 has a tubular lead-holder 6 mounted on it and projecting forwardly from it, and, in the usual way, the stick together with the lead-holder is propelled forwardly or rearwardly according to the direction of rotation of the helix 5, and the lead 4 is accordingly pushed out of, or withdrawn into, the point element 1.

Mounted rigidly on the outside of the forward end of the helix 5 is a short tubular member 7 with a knurled outside surface, known as the knurled bush, by which the helix is rotated relative to the point element 1 and the hub 2. This bush 7 extends forwardly beyond the forward end of the helix 5 and at its forward end engages in an annular recess 1a in the rear end of the point element 1 as shown. This engagement of the bush 7 with the point element 1 forms the means for preventing the helix 5 from moving forwardly relative to the hub 2. To prevent said helix 5 from moving rearwardly relative to the hub 2, said hub has a stop washer 8 clamped on it just beyond the rear end of said helix. The barrel 9 of the pencil fits sufficiently tightly on the bush 7 both for retention of said barrel in place and for enabling said barrel to rotate said bush and therefore said helix.

As so far described the construction is more or less in accordance with standard practice. In the present arrangement the rear lateral projection of the stick 3 consists of an elongated part which first projects at 3a at right angles from the rear end of the stick through the longitudinal slot 2a in the hub 2 and into the spiral slot 5a in the helix 5, and then at 3b extends spirally forwards with said spiral slot to the extent of, say, a single turn or less.

In construction the stick 3, together with the lateral projection 3a, 3b, can be made of a single stamping of light sheet metal. This stamping, in the blank, consists of a strip forming the stick and a strip extension from the rear end of said stick extending first a short distance as at 3a at right angles to said stick, and then turning at an inclined angle forwardly as indicated in chain dotted lines in Figure 3. The forwardly inclined portion is at the correct angle such that by placing the stick within the hub 2 with the short right-angle portion 3a passing through the slot 2a in the hub and into the slot 5a in the helix 5, and by simply wrapping the inclined portion round the hub, said inclined portion will assume the correct spiral shape as 3b to fit in the slot 5a of the helix as stated.

The spiral portion 3b extending forwardly from the right-angle portion 3a forms a spring, and when the stick 3 is screwed forwardly towards its limit, the forward end of this spring abuts against the forward end of the aforesaid annular recess 1a in the rear of the point element. When the stick is then screwed still further forwards, this spring compresses as shown in Figure 4, until the right-angled portion 3a and the stick 3 itself are screwed right out of the spiral slot 5a, and the helix can then continue turning without any part being overstrained, the right-angled portion 3a being kept pressed against the front end of the helix 5 by the spring 3b. The stick 3 is now at the forward limit of its movement. As soon as the helix 5 is turned in the reverse direction, the right-angle portion 3a will re-engage in the spiral slot 5a and the spring 3b will expand and once more engage in the spiral slot and the stick 3 will be retracted.

The original blank may be cut so that the forward extremity of the spring 3b presents an edge in a plane at right angles to the axis of the pencil, which edge abuts flush against the end of the said annular recess 1a in the point element 1.

The lead-holder 6 makes a friction tight sliding fit on the stick 3, and, in the usual way, when the stick is screwed to the extreme forward position the forward end of the lead-holder is stopped by a shoulder 1b in the bore of the point element 1 and the stick 3 continues to move forward, thereby ejecting the lead 4. When the stick 3 is subsequently screwed rearwardly towards its limit, the rear end of the lead-holder 6 first abuts against an obstruction 13 in the hub 2, and subsequently the lead-holder 6 is thereby slid forward relative to the stick 3 to its normal position ready to receive a fresh lead 4. To limit the forward and rearward movement of the lead-holder 6 relative to the stick 3, the former is formed with a short longitudinal slot 6a through which the portion 3a passes as shown. When the projection 3a reaches the rear end of the slot 6a further movement in the rearward direction is stopped.

Referring now to Figure 5, this illustrates a modification in which the above described function of the spring 3b, upon the stick 3 being actuated to the forward limit of its travel also takes place upon said stick being actuated to the rear limit of its travel.

To this end the tubular bush 7 is increased in length and arranged as shown so that it extends rearwardly beyond the rear end of the helix 5, and the bore of the barrel 9 is enlarged for the accommodation of said bush. In the arrangement shown the rear end of said bush 7 is closed by means of a ring 10. The hub 2 is extended rearwardly through a central opening in the ring 10 and the rear end of said hub is closed by means of a screw 11 which also holds the ring 10 in place. The slot 2a in said hub 2 (not designated in Figure 5) terminates at its rear end about flush with the forward surface of the ring 10. The lead-holder 6 at the rear end of its travel, abuts against said screw 11, and the slot 6a in said lead-holder (not designated in Figure 5) is continued to the rear extremity of said lead holder. The reference 12 designates a rear end closure piece for the barrel 9.

From the above it will be seen that as the stick 3 approaches the rear end of its travel, first the rear end of the lead-holder 6 will abut against the screw 13, whereupon continued rotation of the helix 5 in the withdrawing direction will move the stick back without the lead-holder and thus restore the stick and lead-holder to the correct relative position for receiving the lead. When this correct relative position is attained, the portion 3a of the stick unit will abut against the ring 10 and further rearward movement of the stick will accordingly be prevented. Continued rotation of the helix 5 in the withdrawing direction will now progressively screw the spring portion 3b out of the helical slot 5a and said spring portion will be progressively compressed until the position illustrated in Figure 5 is reached at which said spring portion is completely outside said helical slot. Continued rotation of the helix 5 in the withdrawing direction will then simply cause the rearward edge of the said helix to slide over the forward end of said spring portion 3b, and no harm can be inflicted on any of the parts however long this withdrawing rotation is continued.

When the helix is now rotated in the lead-projecting direction, the first time the rear end of the slot 5a registers with the forward end of the spring portion 3b, said forward end of said spring portion 3b will enter said slot, and, as rotation of the helix in the forward direction is continued, said spring portion will progressively enter said slot until the whole of it, including the portion 3a, is in said slot, whereupon continued rotation of said helix in the projecting direction will propel the stick 3 forwardly as heretofore.

It will be appreciated that, in either embodiment of the invention the spring portion 3b is not necessarily made in one integral piece with the stick, but could consist of an ordinary spring of the correct pitch attached to the stick.

We are aware that a mechanically operated pencil has been heretofore proposed comprising a fixed gland of square section, a carrier tube for the lead having a part of square section whereby it is longitudinally slidable but not rotatable in said gland, a wire lead-ejecting element for propelling the lead located in said carrier tube, a lateral projection extending from said lead-ejecting element and passing through a longitudinal slot in said carrier tube, a helical wire spring extending from said lateral projection outside said carrier tube and having its end remote from said lead-ejecting element secured to said carrier tube, an operating tube surrounding said wire spring and formed with a helical groove in which said wire spring engages, said operating tube being capable of rotary but not substantial longitudinal movement, whereby rotation of said operating tube causes said wire spring, and therefore said lead-ejecting element and carrier tube to move longitudinally, means whereby, as said lead-ejecting element approaches one end of its stroke said wire spring is progressively screwed out of the corresponding end of said helical groove, and stop means whereby said wire spring, during such progressive screwing-out, is stopped, so that continued screwing-out causes said wire spring to be compressed until it is screwed completely out of said helical groove, whereupon continued rotation of said operating tube can be effected without damage, the compression of said wire spring ensuring its re-entry into said helical groove upon rotation of said operating tube in the opposite direction.

I claim:

1. A mechanically operated pencil comprising a point portion formed with an axial hole through which the lead is adapted to be projected, a tubular hub secured coaxially to said point portion and extending rearwardly therefrom, said tubular hub having a longitudinal slot through its wall, a tube formed with a helical slot surrounding said hub, a tubular bush surrounding said tube and fixed thereto, said bush extending forwardly beyond the forward end of said tube, forward longitudinal movement of said tube relative to said hub being prevented by abutment of said bush against said point portion, stop means mounted on said hub for preventing rearward longitudinal movement of said tube relative to said hub, a stick, for propelling the lead, located within said hub, a lateral projection extending from said stick and passing through said longitudinal slot in said hub, and a helical portion extending from said lateral projection outside said hub, said helical portion lying within the helical slot of said tube, whereby rotation of said tube relative to said hub causes said helical portion, and therefore said stick, to move longitudinally in said hub, said helical portion, as the stick approaches the forward end of its stroke being adapted to be progressively screwed out of the forward end of said helical slot, and being adapted, during such progressive screwing out to be compressed against said point portion (in the manner of a spring) until it is screwed completely out of said helical slot, whereupon continued rotation of said tube relative to said hub can be effected without damage, the compression of said helical portion ensuring its re-entry into said helical slot upon rotation of said tube in the opposite direction.

2. A mechanically operated pencil comprising a point portion formed with an axial hole through which the lead is adapted to be projected, a tubular hub secured coaxially to said point portion and extending rearwardly therefrom, said tubular hub having a longitudinal slot through its wall, a tube formed with a helical slot surrounding said hub, tubular bush means surrounding said tube and fixed thereto, said bush means extending both forwardly beyond the forward end and rearwardly beyond the rear end of said tube, stop means mounted on said hub at the rear end, forward longitudinal movement of said tube relative to said hub being prevented by abutment of said bush means against said point portion and rearward longitudinal movement of said tube relative to said hub being prevented by abutment of said bush means against said stop means, a stick, for propelling the lead, located within said hub, a lateral projection extending from said stick and passing through said longitudinal slot in said hub and a helical portion extending from said lateral projection outside said hub, said helical portion lying within the helical slot of said tube, whereby rotation of said tube relative to said hub causes said helical portion, and therefore said stick, to move longitudinally in said hub, said helical portion, as the stick approaches either end of its stroke being adapted to be progressively screwed out of the corresponding end of said helical slot, and being adapted, during such progressive screwing out to be compressed against said point portion, in the case of the forward end, or said stop means, in the case of the rear end in the manner of a spring until it is screwed completely out of said helical slot, whereupon continued rotation of said tube relative to said hub can be effected without damage, the compression of said helical portion ensuring its re-entry into said helical slot upon rotation of said tube in the opposite direction.

3. A mechanically operated pencil comprising a tubular hub having a longitudinal slot through its wall, a tube formed with a helical slot surrounding said hub, stop means mounted on said tube at a radius different from that of the wall of said tube and abutting against corresponding stop means which are fixed relative to said hub for preventing movement of said tube relative to said hub in one direction, stop means fixed relative to said hub for preventing movement of said tube relative to said hub in the other direction, means fixed relative to said hub providing a stop surface which is at the same radius as the wall of said hub and is spaced beyond the extremity of said hub in the first named direction, a stick, for propelling the lead, located within said hub, a lateral projection extending from said stick and passing through said longitudinal slot in said hub and a helical portion extending from said lateral projection outside said hub, said helical portion lying within the helical slot of said tube, whereby rotation of said tube relative to said hub causes said helical portion, and therefore said stick, to move longitudinally in said hub, said helical portion, as the stick approaches the end of its stroke in the first named direction being adapted to be progressively screwed out of the corresponding end of said helical slot and being adapted, during such progressive screwing out, to be compressed against said stop surface in the manner of a spring until it is screwed completely out of said helical slot, whereupon continued rotation of said tube relative to said hub can be effected without damage, the compression of said helical portion ensuring its re-entry into said helical slot upon rotation of said tube in the opposite direction.

4. A mechanically operated pencil comprising a tubular hub having a longitudinal slot through its wall, a tube formed with a helical slot surrounding said hub, stop means mounted on said tube at a radius different from that of the wall of said tube and abutting against corresponding forward stop means which are fixed relative to said hub, for preventing forward movement of said tube relative to said hub, stop means mounted on said tube at a radius different from that of the wall of said tube and abutting against corresponding rear stop means which are fixed relative to said hub, for preventing rear movement of said tube relative to said hub, means fixed relative to said hub providing a forward stop surface which is at the same radius as the wall of said hub and is spaced forwardly beyond the forward extremity of said hub, means fixed relative to said hub providing a rear stop surface which is at the same radius as the wall of said hub and is spaced rearwardly beyond the rear extremity of said hub, a stick, for propelling the lead, located within said hub, a lateral projection extending from said stick and passing through said longitudinal slot in said hub, and a helical portion extending from said lateral projection outside said hub, said helical portion lying within the helical slot of said tube, whereby rotation of said tube relative to said hub causes said helical portion and therefore said stick, to move longitudinally in said hub, said helical portion, as the stick approaches either end of its stroke being adapted to be progressively screwed out of the corresponding end of said helical slot, and being adapted, during such progressive screwing out to be compressed against said forward or rear stop surface, as the case may be, in the manner of a spring until it is screwed completely out of said helical slot, whereupon continued rotation of said tube relative to said hub can be effected without damage; the compression of said helical portion ensuring its re-entry into said helical slot upon rotation of said tube in the opposite direction.

5. A mechanically operated pencil comprising a tubular hub having a longitudinal slot through its wall, a tube formed with a helical slot surrounding said hub, stop means mounted on said tube at a radius different from that of the wall of said tube and abutting against corresponding stop means which are fixed relative to said hub for preventing movement of said tube relative to said hub, in one direction, stop means fixed relative to said hub for preventing movement of said tube relative to said hub, in the other direction, means fixed relative to said hub providing a stop surface which is at the same radius as the wall of said hub and is spaced beyond the extremity of said hub in the first named direction, a stick for propelling the lead, a lateral projection extending from said stick and passing through said longitudinal slot in said hub, and a helical portion extending from said lateral projection outside said hub, said helical portion lying within the helical slot of said tube, whereby rotation of said tube relative to said hub causes said helical portion and therefore said stick, to move longitudinally in said hub, said stick, said lateral projection and said helical portion being formed of one integral stamping of sheet metal, said helical portion as the stick approaches the end of its stroke in the first named direction being adapted to be progressively screwed out of the corresponding end of said helical slot and being adapted, during such progressive screwing out, to be compressed against said stop surface in the manner of a spring until it is screwed completely out of said helical slot, whereupon continued rotation of said tube relative to said hub can be effected without damage, the compression of said helical portion ensuring its re-entry into said helical slot upon rotation of said tube in the opposite direction.

6. A mechanically operated pencil comprising a tubular hub having a longitudinal slot through its wall, a tube formed with a helical slot surrounding said hub, a bush surrounding said tube and fixed thereto and projecting beyond one end of said tube, stop means fixed relative to said hub, the projecting extremity of said bush abutting against said stop means for preventing movement of said tube relative to said hub, in one direction, stop means fixed relative to said hub for preventing movement of said tube relative to said hub in the other direction, a stick for propelling the lead, located within said hub, a lateral projection extending from said stick and passing through said longitudinal slot in said hub, and a helical portion extending from said lateral projection outside said hub, said helical portion lying within the helical slot of said tube, whereby rotation of said tube relative to said hub causes said helical portion, and therefore said stick, to move longitudinally in said hub, said helical portion, as the stick approaches the end of its stroke in the first named direction being adapted to be screwed out of the corresponding end of said helical slot, and being adapted during such progressive screwing out to be compressed against said first named stop means in the manner of a spring until it is screwed completely out of said helical slot, whereupon continued rotation of said tube relative to said hub can be effected without damage, the compression of said helical portion ensuring its re-entry into said helical slot upon rotation of said tube in the opposite direction.

7. A mechanically operated pencil comprising a tubular hub having a longitudinal slot through its wall, a tube formed with a helical slot surrounding said hub, a bush surrounding said tube and fixed thereto and projecting beyond one end of said tube, stop means fixed relative to said hub, the projecting extremity of said bush abutting against said stop means for preventing movement of said tube relative to said hub in one direction, stop means fixed relative to said hub for preventing movement of said tube relative to said hub in the other direction, a stick for propelling the lead, located within said hub, a lateral projection extending from said stick and passing through said longitudinal slot in said hub, and a helical portion extending from said lateral projection outside said hub, said helical portion lying within the helical slot of said tube whereby rotation of said tube relative to said hub, causes said helical portion, and therefore said stick, to move longitudinally in said hub, said helical portion, as the stick approaches the end of its stroke in the first named direction being adapted to be screwed out of the corresponding end of said helical slot, and being adapted during such progressive screwing out to be compressed against said first named stop means in the manner of a spring until it is screwed completely out of said helical slot whereupon continued rotation of said tube relative to said hub can be effected without damage, the compression of said helical portion ensuring its re-entry into said helical slot upon rotation of said tube in the opposite direction, a pencil point portion in fixed relation to said hub, and a pencil barrel portion surrounding said bush in friction-tight relation.

GEORGE HUGO WEINBERGER.

REFERENCES CITED

The following references are of record in the file of this patent:

UNITED STATES PATENTS

| Number | Name | Date |
|---|---|---|
| 1,496,763 | D'Olier | June 3, 1924 |

FOREIGN PATENTS

| Number | Country | Date |
|---|---|---|
| 569,745 | Great Britain | June 6, 1945 |